United States Patent
Niikura

(10) Patent No.: US 7,884,856 B2
(45) Date of Patent: Feb. 8, 2011

(54) IMAGING APPARATUS AND EXPOSURE CONTROL METHOD THEREOF

(75) Inventor: Kentaro Niikura, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 406 days.

(21) Appl. No.: 11/714,767

(22) Filed: Mar. 7, 2007

(65) Prior Publication Data
US 2007/0211166 A1    Sep. 13, 2007

(30) Foreign Application Priority Data
Mar. 9, 2006    (JP) .............................. 2006-064275

(51) Int. Cl.
*H04N 5/235* (2006.01)
(52) U.S. Cl. .................. 348/221.1; 348/222.1; 348/362
(58) Field of Classification Search ............. 348/221.1, 348/222.1, 362–369
See application file for complete search history.

(56) References Cited

U.S. PATENT DOCUMENTS

| | | | |
|---|---|---|---|
| 6,914,630 B2 * | 7/2005 | Nakamura | 348/296 |
| 7,092,019 B1 * | 8/2006 | Ogata et al. | 348/263 |
| 2001/0030708 A1 * | 10/2001 | Ide et al. | 348/362 |
| 2007/0120997 A1 * | 5/2007 | Sasaki et al. | 348/362 |
| 2007/0177004 A1 * | 8/2007 | Kolehmainen et al. | 348/42 |

FOREIGN PATENT DOCUMENTS

| JP | 2001-0268449 | 9/2001 |
|---|---|---|
| JP | 2002-010143 | 1/2002 |

* cited by examiner

*Primary Examiner*—Gevell Selby
(74) *Attorney, Agent, or Firm*—Young & Thompson

(57) ABSTRACT

An imaging apparatus includes a CCD sensor to perform exposure and output a plurality of captured images in response to a control signal, an image composer to combine the plurality of captured images and produce a composite image, and an exposure controller to supply a SUB signal to the CCD sensor such that an exposure start timing differs by the plurality of captured images if a timing to start exposure by the CCD sensor is included within an output period of the CCD sensor.

16 Claims, 6 Drawing Sheets

RELATED ART

IMAGING APPARATUS AND EXPOSURE CONTROL METHOD THEREOF

BACKGROUND OF THE INVENTION

1. Field of the Invention

The present invention relates to an imaging apparatus and an exposure control method of the same and, particularly, to an imaging apparatus including an image pickup device to generate a plurality of captured images and an exposure control method of the same.

2. Description of the Related Art

For imaging apparatus including an image pickup device such as a CCD (Charge Coupled Device), various techniques have been proposed to reduce noise and increase dynamic range in a quest to improve the quality of captured images.

A common technique to increase dynamic range is to combine a plurality of images by overlaying one another in a CCD sensor. This technique corrects image blurring (displacement) due to hand-shake or the like when superimposing a plurality of images on one another to thereby increase dynamic range and suppress deterioration of image quality.

Typically, a CCD sensor accumulates charges in a photoreceptor through exposure, discharges (sweeps out) the accumulated charges to a substrate, sequentially transfers out the discharged charges, and then outputs a captured image. A CCD sensor carries out the exposure, charge discharging and image output in response to control signals supplied from a controller. An exposure (shutter) time of a CCD sensor is controlled by a SUB pulse (charge discharging pulse), which is one of control signals supplied from a controller to a CCD sensor.

There is some kind of noises occurring in a CCD sensor, which causes deterioration of image quality. A dark charge (dark current) noise is one kind of noises that occur in a CCD sensor. The dark charge noise is caused by charges that are accumulated irrespective of light in the light blocked condition. The dark charge noise is generated mostly by SUB pulses that are applied to a CCD sensor.

FIG. 5 is a conceptual illustration of a captured image where a dark charge noise occurs. A captured image is formed by a CCD sensor that outputs pixels (charges) row by row from the top to the bottom of the image. In FIG. 5, the reference numeral 501 indicates an image of a non-exposure period when a SUB pulse is supplied during image output and exposure is not performed, and 502 indicates an image of an exposure period where a SUB pulse is stopped during image output from a CCD sensor and exposure on the next image is performed. A dark charge noise 503 is generated horizontally on the boundary between the non-exposure period 501 and the exposure period 502.

Therefore, for still shoot in which high quality image is required, an image during the non-exposure period (during the supply of SUB pulses) is often discarded without being used. However, the image blurring correction through image superimposition requires a plurality of still-shot images that are continuously taken at the shortest possible time intervals and it is thus necessary to carry out the exposure and the image output at the same time.

FIG. 6 illustrates that a plurality of captured images are superimposed on one another in an imaging apparatus of a related art. When correcting image blurring by way of image superimposition, the imaging apparatus of a related art takes a plurality of images at an exposure time per captured image (B/N) that is calculated by dividing an appropriate exposure (total exposure time B per composite image) by the number N of images taken and then superimposes the N number of captured images on one another. In this example, three captured images from 601a to 601c are superimposed on one another to thereby produce a composite image 602 after correction.

As shown in FIG. 6, a CCD sensor performs exposure and image output at an interval of Vsync (vertical synchronization) signal. A period during which a SUB pulse is supplied is a non-exposure period, a period during which a SUB pulse is not supplied is an exposure period, and period during which the charges discharged by a SUB pulse are output is an image output period.

In the captured images from 601a to 601c, the exposure starts during the image output period, and a dark charge noise occurs at the position of the start of the exposure. In the imaging apparatus of a related art, the non-exposure period when a SUB pulse is applied and the exposure period when a SUB pulse is not applied are the same for each captured image and thus the timing to start the exposure is the same, which causes a dark charge noise to occur at the same position in every captured image. As a result, in the composite image 602 that is produced by superimposing such captured images, the dark charge noises of the captured images overlap to enhance the noise to appear remarkably, which significantly deteriorates the image quality.

Japanese Unexamined Patent Application Publication Nos. 2002-10143 (Yoshida et al.) and 2001-268449 (Sakurai et al.) disclose imaging apparatus to reduce such dark charge noises.

The imaging apparatus of related arts such as Yoshida et al. and Sakurai et al. suppress the deterioration of image quality due to noise by way of controlling exposure by a timing to open and close a physical shutter (mechanical shutter) and a timing of SUB pulses. Therefore, the imaging apparatus of related arts cannot reduce noises such as a dark charge noise to suppress the deterioration of image quality unless it has a physical shutter.

SUMMARY OF THE INVENTION

According to one aspect of the present invention, there is provided an imaging apparatus including an image pickup device to perform exposure and output a plurality of captured images in response to a control signal, an image composer to combine the plurality of output captured images into a composite image, and an exposure controller to supply the control signal to the image pickup device such that an exposure start timing differs by the plurality of captured images if a timing to start exposure by the image pickup device is included within an output period of the captured images. The imaging apparatus controls an exposure time of the image pickup device only by a control signal of the image pickup device, and it is thus capable of reducing noises such as a dark charge noise and preventing the deterioration of image quality without the use of a physical shutter as in related arts.

According to another aspect of the present invention, there is provided an exposure control method of an imaging apparatus including performing exposure and outputting a plurality of captured images by an image pickup device in response to a control signal, combining the plurality of output captured images into a composite image, and supplying the control signal to the image pickup device such that an exposure start timing differs by the plurality of captured image if a timing to start exposure by the image pickup device is included within an output period of the captured images. The exposure control method of an imaging apparatus controls an exposure time of the image pickup device only by a control signal of the image pickup device, and it is thus capable of reducing noises such as a dark charge noise and preventing the deterioration of image quality without the use of a physical shutter as in related arts.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

An imaging apparatus according to a first embodiment of the present invention is described hereinafter. The imaging apparatus according to this embodiment sets different exposure times for different captured images to thereby reduce some dark charge noises.

Figure 1:
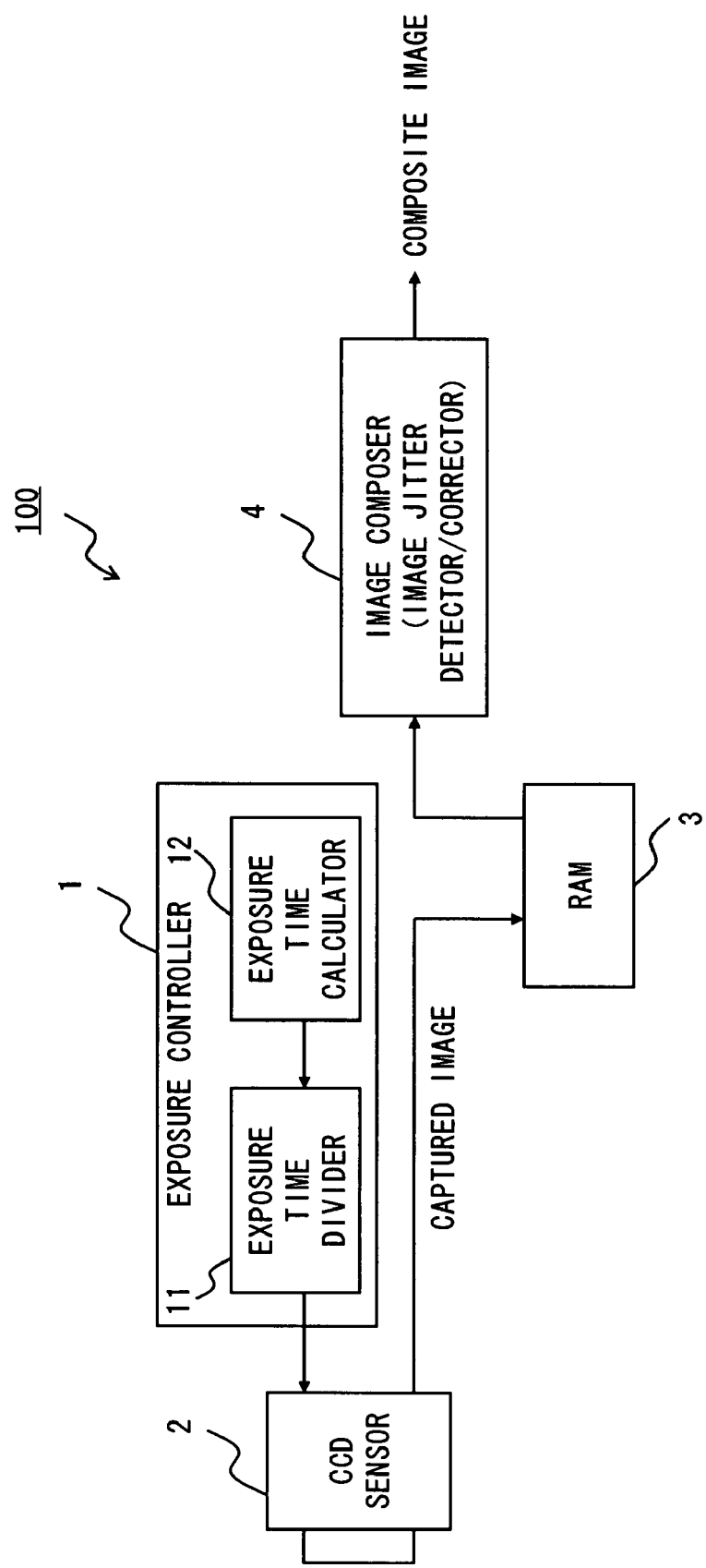
FIG. 1 is a block diagram showing the structure of an imaging apparatus according to an embodiment of the present invention.

The structure of the imaging apparatus according to this embodiment is described hereinafter with reference to FIG. 1. The imaging apparatus 100 corrects image blurring by superimposing a plurality of images. As shown in FIG. 1, the imaging apparatus 100 includes an exposure controller 1, a CCD sensor 2, a RAM (Random Access Memory) 3, and an image composer 4.

The CCD sensor 2 is a solid-state image pickup device to generate a captured image using charges that are generated by photoelectrical conversion of incident light. Instead of the CCD sensor 2, other image pickup devices such as a CMOS (Complementary Metal Oxide Semiconductor) sensor may be used. Particularly, the CCD sensor 2 uses an electronic shutter, not a physical shutter, to perform exposure according to a control signal such as a SUB pulse (charge discharging pulse) and output a plurality of captured images.

The CCD sensor 2 may include a color filter, a photoreceptor such as a photodiode, a charge transfer section, a charge amplifier, and so on. The photoreceptor photoelectrically converts incident light from the color filter to accumulate charges, the charge transfer section transfers the charges discharged from the photoreceptor in response to a SUB pulse, and the charge amplifier converts the charges transferred from the charge transfer section into signal voltages and outputs them as a captured image (image data). The CCD sensor 2 performs exposure when a SUB pulse is not supplied. Specifically, the period during which a SUB pulse is applied is a non-exposure period when exposure is not performed, and a period during which a SUB pulse is not applied is an exposure period when exposure is performed.

The RAM 3 is a memory to store a plurality of captured images that are output from the CCD sensor 2. The image composer 4 retrieves the plurality of captured images that are output from the CCD sensor 2 and stored in the RAM 3 and combines the plurality of captured images by superimposing them on one another to thereby generate one composite image. The image composer 4 serves also as an image blurring detector/corrector to detect image blurring of a plurality of images and correct the jitter upon superimposition of a plurality of captured images.

The exposure controller 1 may be a part of a driver circuit to drive the CCD sensor 2 and controls an exposure time of the CCD sensor 2 by supplying a control signal such as a SUB pulse (charge discharging pulse) to the CCD sensor 2. In this embodiment, if a timing when the CCD sensor 2 starts exposure occurs within the captured image output period, the exposure controller 1 supplies a SUB pulse to the CCD sensor 2 so that the exposure start timing differs in each of a plurality of captured images.

The exposure controller 1 includes an exposure time calculator 12 and an exposure time divider 11. The exposure time calculator 12 calculates a total exposure time B per composite image which is necessary for appropriate exposure and supplies the total exposure time B to the exposure time divider 11.

The exposure time divider 11 divides the total exposure time B calculated by the exposure time calculator 12 into divided exposure times C for respective captured images and supplies a SUB pulse to the CCD sensor 2 in accordance with the divided exposure times C. In the imaging apparatus of related arts, an exposure time of each captured image when the number of superimposed images is N is fixed to B/N. On the other hand, this embodiment provides different exposure times C (shutter speed) for different captured images so that the divided exposure time C is not the same in the captured images.

Specifically, the exposure time divider 11 allocates different divided exposure times C for different captured images included in one composite image while keeping the total exposure time B per composite image to a given value. Although the continuous images obtained in this manner have different brightness (exposure time), noise is not prominent in the images superimposed on one another because dark charge noises due to SUB pulses are dispersed. Further, this does not affect the image blurring correction effects because a total exposure time of all images is the same as the appropriate total exposure time B.

The exposure time divider 11 may have any structure as long as it can set the divided exposure times C to different values within the total exposure time B. For example, it is possible to store the divided exposure times C corresponding to the total exposure time B into a memory in advance and retrieve them or to calculate the divided exposure times C from the total exposure time B and the number N of captured images using a prescribed function.

Figure 2:
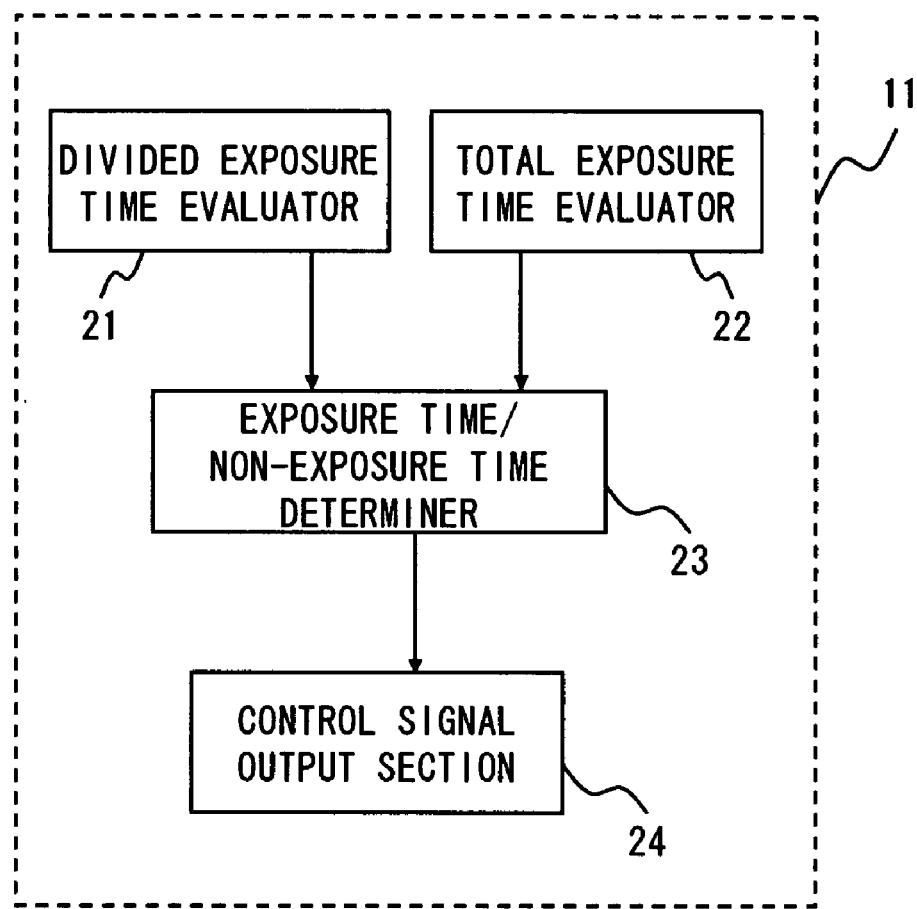
FIG. 2 is a block diagram showing the structure of an exposure time divider according to an embodiment of the present invention.

FIG. 2 is a block diagram showing an example structure of the exposure time divider 11. The exposure time divider 11 may include a divided exposure time evaluator 21, a total exposure time evaluator 22, an exposure time/non-exposure time determiner 23, and a control signal output section 24.

The divided exposure time evaluator 21 calculates the divided exposure times C for the number N of captured images from the total exposure time B and evaluates if the calculated values are different for each captured image. The total exposure time evaluator 22 evaluates if a total of the divided exposure times C is the same as the total exposure time B.

The exposure time/non-exposure time determiner 23 determines an exposure time and a non-exposure time for each captured image based on the results of the evaluation in the divided exposure time evaluator 21 and the evaluation in the total exposure time evaluator 22. The control signal output section 24 outputs a control signal to the CCD sensor 2 in accordance with the exposure time and the non-exposure time determined by the exposure time/non-exposure time determiner 23. In this example, a SUB pulse is output in accordance with the non-exposure time.

Figure 3:
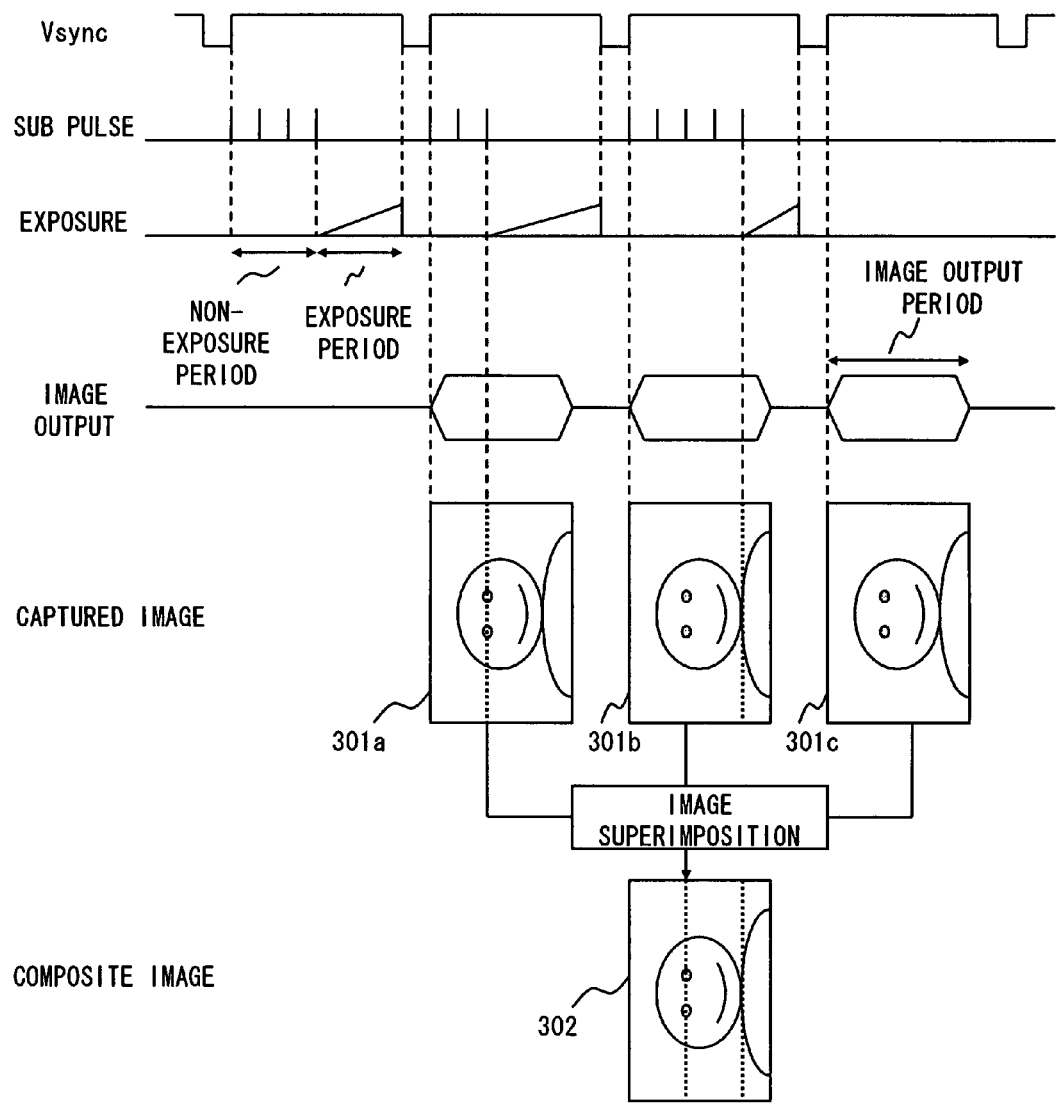
FIG. 3 is a timing chart illustrating the operation to combine captured images in an imaging apparatus according to an embodiment of the present invention.

An example of combining the images captured by the imaging apparatus according to this embodiment is described hereinafter. FIG. 3 illustrates a case of simply controlling an exposure time for each captured image. In this example, three captured images 301a to 301c are superimposed on one another to produce a corrected composite image 302.

As shown in FIG. 3, upon supply of a Vsync (vertical synchronization) signal and a SUB pulse from the exposure controller 1 to the CCD sensor 2, the CCD sensor 2 performs exposure and output of the captured images 301a to 301c according to these signals, and the image composer 4 combines these captured images into the composite image 302. The CCD sensor 2 carries out the exposure and output of one captured image at the interval of the Vsync signal. As described above, a period when a SUB pulse is supplied is a non-exposure period, a period when a SUB pulse is not supplied is an exposure period, and a period when charges discharged by a SUB pulse are output is an image output period.

In this embodiment, an output time of a SUB pulse from the exposure controller 1 differs by captured image and accordingly an exposure time and a non-exposure time differ by captured image. Exposure start positions in captured images are thus different, so that the positions of dark charge noises due to SUB pulses are dispersed. As a result, although dark charge noises occur in a plurality of positions in the composite image 302 produced by superimposing these images, the dark charge noises do not overlay and are thus kept small, so that the noises are not emphasized and appear significantly as in related arts.

As described in the foregoing, this embodiment provides different exposure times for different captured images in a CCD sensor to thereby change exposure start positions. The noise occurring in each captured image is thereby not superimposed but dispersed, thus preventing the deterioration of image quality. Further, the embodiment controls so as to maintain a constant total exposure time, thus keeping the brightness of an image produced by superimposition to be constant.

Particularly, this embodiment controls an exposure time only by a control signal (SUB pulse) of a CCD sensor, and it is thus capable of preventing the deterioration of image quality without the use of a physical shutter as in related arts.

Second Embodiment

An imaging apparatus according to a second embodiment of the present invention is described hereinbelow. The imaging apparatus of this embodiment performs exposure during a period other than the image output period to thereby reduce dark charge noises.

The structures of the imaging apparatus 100 and the exposure time divider 11 are the same as those shown in FIGS. 1 and 2. In this embodiment, the exposure controller 1 controls the exposure time of each captured image such that the exposure time does not coincide with the image output period.

Figure 4:
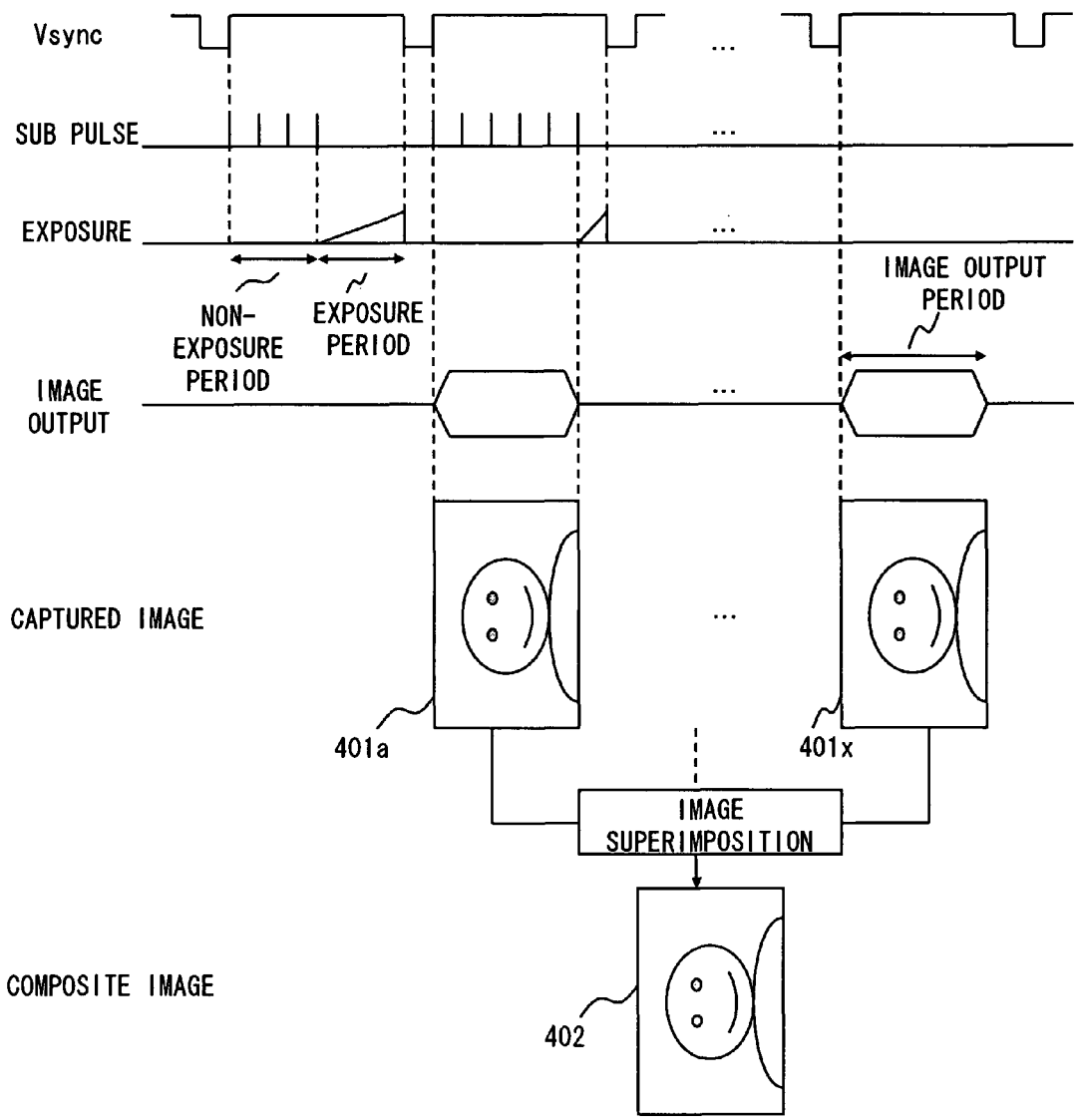
FIG. 4 is a timing chart illustrating the operation to combine captured images in an imaging apparatus according to an embodiment of the present invention.
Figure 5:
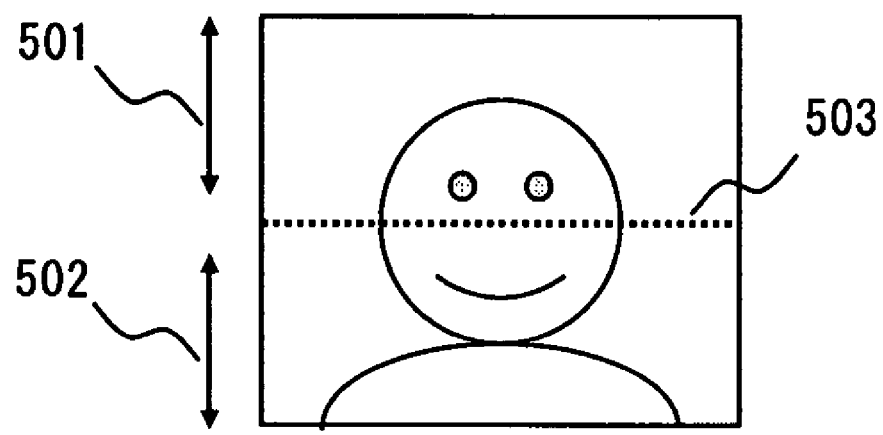
FIG. 5 is a view to describe a dark charge noise that occurs in a captured image.
Figure 6:
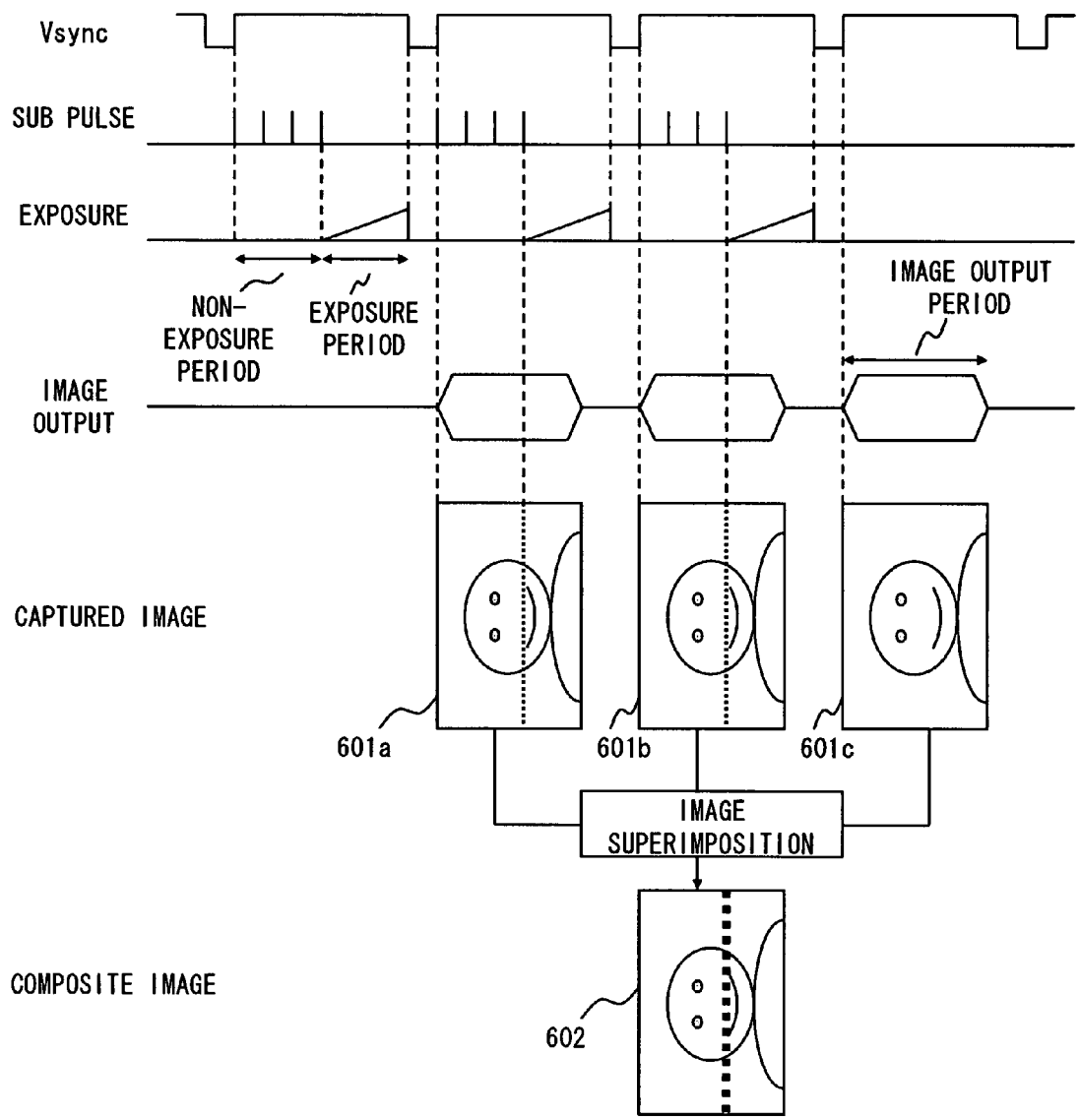
FIG. 6 is a timing chart illustrating the operation to combine captured images in an imaging apparatus according to a related art.

An example of combining the images captured by the imaging apparatus according to this embodiment is described hereinafter. FIG. 4 illustrates a case of controlling an exposure time so that it does not coincide with the image output period. In this example, an arbitrary plurality of captured images 401a to 401x are superimposed on one another to produce a corrected composite image 402.

In this embodiment, the exposure controller 1 outputs a SUB pulse to the CCD sensor 2 during the image output period and therefore the image output period and the exposure period do not coincide with each other. Specifically, the exposure starts after completing the image output in the CCD sensor 2, thereby preventing dark charge noises due to SUB pulses from occurring in captured images. The composite image 402 produced by superimposing these images thus does not contain any dark charge noise.

As described above, the exposure time does not coincide with the image output time in this embodiment. Therefore, although the number of superimposed images varies by the total exposure time necessary for appropriate exposure, this embodiment completely eliminates the effect of dark charge noises due to SUB pulses to thereby further improve the image quality compared with the first embodiment. Further, like the first embodiment, it is also capable of preventing the deterioration of image quality without the use of a physical shutter as in related arts.

It is apparent that the present invention is not limited to the above embodiment that may be modified and changed without departing from the scope and spirit of the invention.

What is claimed is:

1. An imaging apparatus comprising:
an image pickup device constructed and arranged to perform a plurality of exposures during respective non-overlapping exposure periods and output an associated plurality of captured images in response to a control signal, each of the exposures being triggered relative a periodic synchronization signal;
an image composer to combine the plurality of output captured images into a composite image; and
an exposure controller to supply the control signal to the image pickup device such that an exposure start timing with respect to an associated pulse of the synchronization signal differs among the plurality of captured images if a timing to start exposure by the image pickup device is included within an output period of the captured images.

2. The imaging apparatus according to claim 1, wherein the exposure controller controls such that an exposure time of the image pickup device differs in each of the plurality of captured images.

3. The imaging apparatus according to claim 2, wherein the exposure controller controls such that an exposure period of the image pickup device does not coincide with the output period of the captured images.

4. The imaging apparatus according to claim 1, wherein the exposure controller sets a total of exposure times of the plurality of captured images to a prescribed time.

5. The imaging apparatus according to claim 2, wherein the exposure controller sets a total of exposure times of the plurality of captured images to a prescribed time.

6. The imaging apparatus according to claim 3, wherein the exposure controller sets a total of exposure times of the plurality of captured images to a prescribed time.

7. The imaging apparatus according to claim 2, wherein the control signal supplied to the image pickup device is a charge discharging pulse for the image pickup device to discharge charges, and
the exposure controller controls an overlap of an exposure period and the output period by changing the number of charge discharging pulses.

8. The imaging apparatus according to claim 3, wherein the control signal supplied to the image pickup device is a charge discharging pulse for the image pickup device to discharge charges, and
the exposure controller controls an overlap of an exposure period and the output period by changing the number of charge discharging pulses.

9. The imaging apparatus according to claim 4, wherein the control signal supplied to the image pickup device is a charge discharging pulse for the image pickup device to discharge charges, and
the exposure controller controls an overlap of an exposure period and the output period by changing the number of charge discharging pulses.

10. The imaging apparatus according to claim 5, wherein the control signal supplied to the image pickup device is a charge discharging pulse for the image pickup device to discharge charges, and
the exposure controller controls an overlap of an exposure period and the output period by changing the number of charge discharging pulses.

11. The imaging apparatus according to claim 6, wherein the control signal supplied to the image pickup device is a charge discharging pulse for the image pickup device to discharge charges, and
the exposure controller controls an overlap of an exposure period and the output period by changing the number of charge discharging pulses.

12. An imaging apparatus comprising:
an image pickup device to perform exposure and output a plurality of captured images in response to a control signal;
an image composer to combine the plurality of output captured images into a composite image; and
an exposure controller to supply the control signal to the image pickup device such that an exposure start timing differs by among the plurality of captured images if a timing to start exposure by the image pickup device is included within an output period of the captured images;
wherein the exposure controller controls such that no exposure period of the image pickup device overlaps with any of the output periods of the captured images.

13. The imaging apparatus according to claim 12, wherein the exposure controller sets a total of exposure times of the plurality of captured images to a prescribed time.

14. The imaging apparatus according to claim 12, wherein the control signal supplied to the image pickup device is a charge discharging pulse for the image pickup device to discharge charges, and
the exposure controller controls an overlap of an exposure period and the output period by changing the number of charge discharging pulses.

15. The imaging apparatus according to claim 13, wherein the control signal supplied to the image pickup device is a charge discharging pulse for the image pickup device to discharge charges, and
the exposure controller controls an overlap of an exposure period and the output period by changing the number of charge discharging pulses.

16. An imaging apparatus comprising:
an image pickup device to perform exposure and output a plurality of captured images in response to a control signal;
an image composer to combine the plurality of output captured images into a composite image; and
an exposure controller to supply the control signal to the image pickup device such that an exposure start timing differs by the plurality of captured images if a timing to start exposure by the image pickup device is included within an output period of the captured images;
wherein the control signal supplied to the image pickup device is a charge discharging pulse for the image pickup device to discharge charges, and
the exposure controller controls an overlap of an exposure period and the output period by changing the number of charge discharging pulses.

* * * * *